United States Patent [19]

Sokolow

[11] 4,124,308
[45] Nov. 7, 1978

[54] SEQUENTIAL CO-INJECTION UNIT ADAPTED FOR STRUCTURAL FOAM MOLDING

[75] Inventor: Nickolas N. Sokolow, Cheshire, Mass.

[73] Assignee: Beloit Corporation, Beloit, Wis.

[21] Appl. No.: 808,704

[22] Filed: Jun. 21, 1977

[51] Int. Cl.² .......................... B29B 1/10; B29F 1/03
[52] U.S. Cl. ...................................... 366/77; 366/89; 425/557
[58] Field of Search ....................... 366/75, 76, 77, 88, 366/89, 91, 192; 425/208, 557, 558, 560, 817 R; 159/2 E

[56] References Cited

U.S. PATENT DOCUMENTS

| 3,814,779 | 6/1974 | Wiley | 425/208 X |
| 3,939,236 | 2/1976 | Hahn | 425/817 R X |

FOREIGN PATENT DOCUMENTS 1,360,133  7/1974  United Kingdom ................ 425/817 R Primary Examiner—Philip R. Coe
Attorney, Agent, or Firm—Hill, Gross, Simpson, Van Santen, Steadman, Chiara & Simpson

[57] ABSTRACT

A single screw injection device or extruder sequentially injects skin and foamed plastics melts into a mold to produce structural skin covered foam molded parts free from swirl marks. A single extrusion screw or plasticator selectively feeds, compresses and meters a plastics melt to a first injector for skin melt injection or to a gas injection well where it meters gas flow into the melt, mixes the gas and melt to form a foam and feeds the foam to a second injector for foam melt injection into the mold. A valve controls the flow of the plastics melt and the foamed plastics melt to a single injection nozzle for discharge into the mold. In sandwich molding, a small amount of the unfoamed melt is first injected to form the skin for the molded article and then the valve is shifted to connect the nozzle with the foamed melt from the screw whereupon the injector forces the foamed melt through the nozzle into the mold to overlie the skin melt. The skin melt and the foamed melt are fed through the same nozzle and swirling in the mold is avoided.

4 Claims, 5 Drawing Figures

SEQUENTIAL CO-INJECTION UNIT ADAPTED FOR STRUCTURAL FOAM MOLDING

FIELD OF THE INVENTION

This invention relates to the art of injection molding and particularly deals with a single nozzle injector sequentially feeding skin and foamed melts to a mold under control of a valve.

THE PRIOR ART

Heretofore selective injection of two different melts into a mold has required two separate mixing screws as, for example, in the Garner U.S. Pat. No. 3,599,290 issued Aug. 17, 1971. Also, the screw mixing of a melt with a foaming agent to form a foamed melt has required arresting the rotations of the screw after a sufficient amount of melt has been prepared for producing the molded article, as for example, in the Finkmann et al U.S. Pat. No. 3,793,416 issued Feb. 19, 1974. This screw was only used between injections and then only fed a single foam mix.

SUMMARY OF THIS INVENTION

The present invention now provides a single screw injector for selective feeding of a plurality of melts into a mold, particularly for sequential feeding of skin and foamed melts into a mold. The device of this invention only requires a single feed and mixing screw and has a valve which sequentially feeds different plastics melts to the nozzle, particularly skin and foamed thermo plastics melts. The screw feeds, compresses, and meters a thermo plastics melt for direct feed to a nozzle or to a gas port or well where gas such as nitrogen is metered into the melt and intimately admixed with the melt to form a foam which is fed to the same nozzle. Separate injectors receive the solid and foamed melts from the screw and a valve selectively joins the injectors with the nozzle. Since the unfoamed and foamed melts are fed through the same nozzle under the complete control of a valve, heretofore obtained swirl marks of the foamed melt in the skin are avoided.

It is then an object of this invention to provide a single screw feed device for sequential injection of unfoamed and foamed melts through a single nozzle into a mold for producing skin covered foamed structural molded articles free from swirl marks in the skin.

Another object of the invention is to provide a single screw feeder for unfoamed and foamed melts having a valve sequentially discharging unfoamed and foamed melts through a single nozzle into a molding cavity.

Another object of the invention is to provide a single nozzle, single screw injection molding feed device effective to sequentially feed an unfoamed melt and to form and feed a foamed melt.

A still further object of this invention is to provide a single nozzle, single screw feed device with a valve controlling sequential flow to the nozzle of a plurality of streams of plastic melts.

A still further object of the invention is to provide a co-injection feeder screw for injection molding machines effective to meter and mix a thermo plastics melt for feeding to one injector and to form a foamed melt for feeding to another injector.

Other and further objects of this invention will become apparent to those skilled in this art from the following detailed description of the annexed sheets of drawings which, by way of example only, illustrate this invention.

ON THE DRAWINGS

AS SHOWN ON THE DRAWINGS

Figure 1:
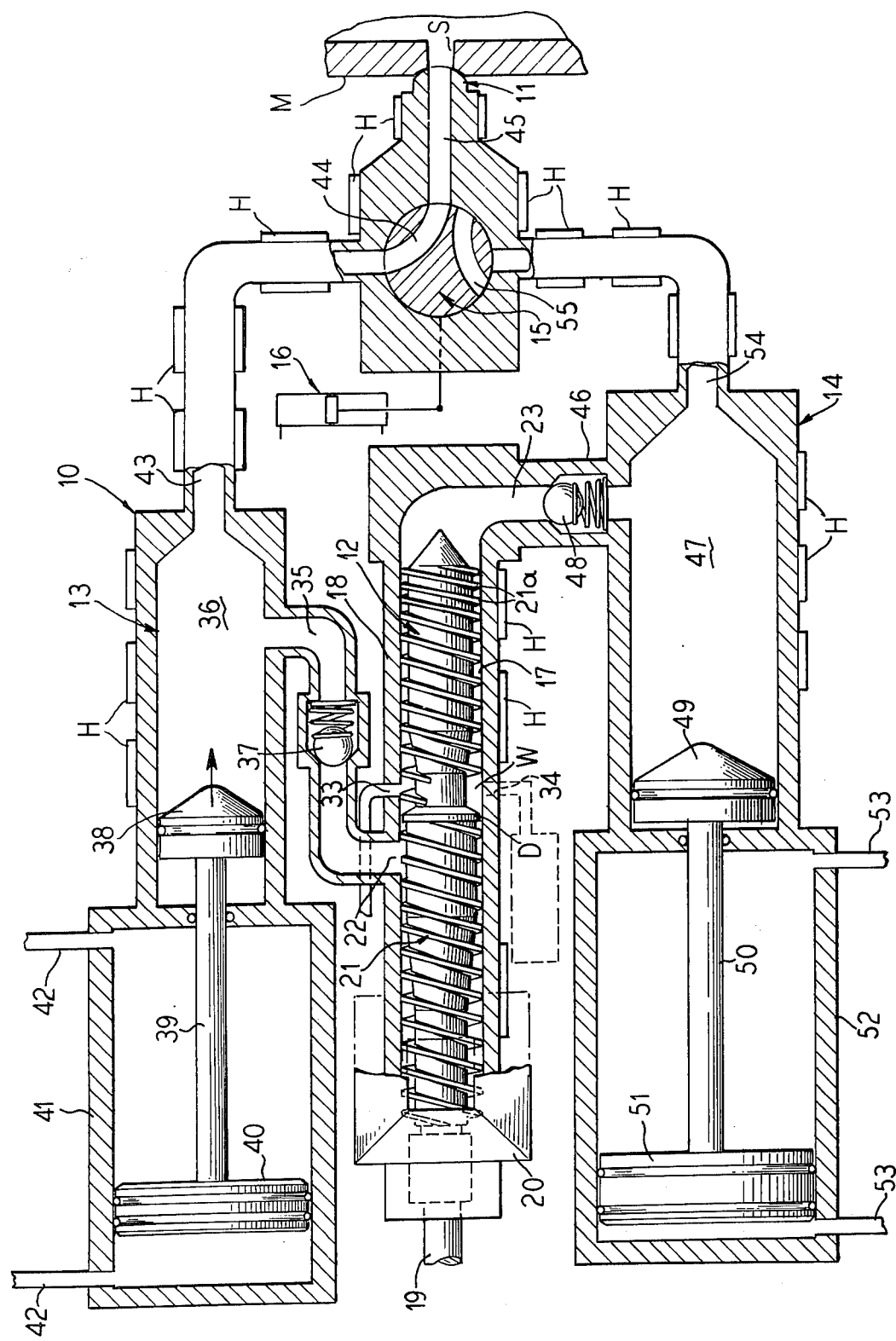
FIG. 1 is a somewhat diagrammatic top view, with parts in horizontal section, of a co-injection unit according to this invention with the valve in position for injection of solid melt plastics material.

The unit 10 of this invention as shown in FIG. 1 has a single nozzle 11 seated against a mold M to inject plastics melts such as nylon or acetal resins through the sprue S into the interior of the mold to form molded articles, preferably sandwich moldings with foamed cores and smooth skins. The unit 10 sequentially injects a plurality of melts into the mold M through the single nozzle 11.

The unit 10 has a single extrusion screw 12, a first injector 13 for solid melts, a second injector 14 for foamed melts, a rotary valve 15 controlling flow from the first and second injectors 13 and 14 to the nozzle 11 and an actuator 16 for the valve 15.

The single screw 12 is rotatably mounted in the cylindrical bore 17 of an elongated housing 18 and is coupled at one end thereof with a drive shaft 19 to rotate the screw in the bore 17. A hopper or other feed device 20 supplies plastics material into the bore 17 of the housing at the driven end of the screw 12 and helical vanes or flights 21 on the screw advance the melt through the bore 17 to a first outlet port 22 communicating with the first injector 13 and to a second port 23 communicating with the second injector 14.

Figure 4:
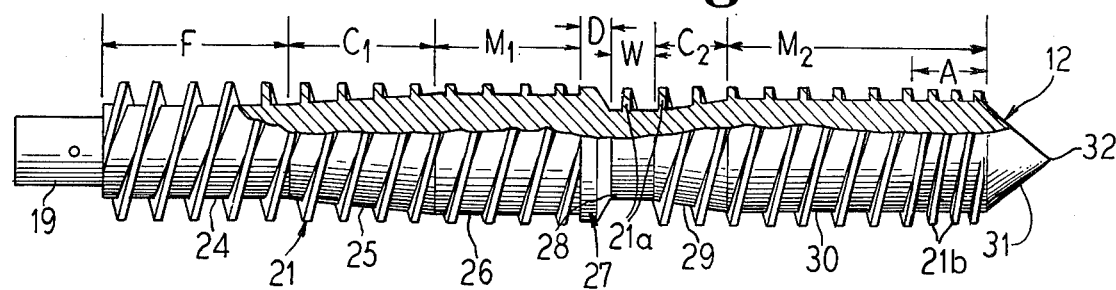
FIG. 4 is an elevational view, with a portion in longitudinal section, of the screw or plasticator of the unit of this invention.

As best shown in FIG. 4, the screw 12 has a varying root diameter along the length thereof but the vanes or flights 21 will have a close running clearance with the bore 17. The channels between the flights will thus have varying depths to control transporting, melting and mixing of the plastics material through the bore.

Figure 5:
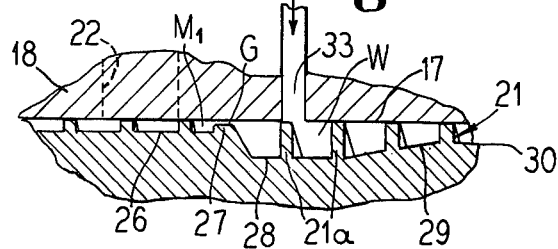
FIG. 5 is an enlarged fragmentary longitudinal cross sectional view of the gas dam or seal of the screw of FIG. 4.

As shown in FIG. 4, the left hand end of the screw receiving the plastics from the feed device 20 has a small root diameter 24 for a length "F" to transport the plastics material to a first compression zone $C_1$ having a tapered root diameter 25 diverging from the small diameter 24 to a greater diameter 26 extending for a length $M_1$ terminating at a collar 27 of smaller diameter than the vanes 21 to provide an extrusion gap G between the periphery of the collar 27 and the bore 17 as shown in FIG. 5. The collar 27 tapers to a small diameter 28 and forms a gas dam "D" between the root diameters 26 and 28. The small diameter 28 continues for a length "W" of the screw to a tapered diameter 29 diverging along a length $C_2$ to an increased diameter 30 which extends for a length $M_2$ to a conical wall 31 tapering to a point 32 from the diameter 30. Several turns of the flights 21b on the diameter 30 adjacent the conical wall 31 can be closer together and have a lesser pitch to provide an efficient mixing zone A as more fully described in my U.S. Pat. Nos. 3,945,622 and 3,942,774. The vanes 21a in the length "W" of the screw can have free ends providing entrance mouths to the downstream flights.

The varying root diameters and vane heights along the length of the screw provide a feed portion F receiving and advancing the plastic material from the feed device 20, a compression zone $C_1$ compressing and melting the plastics material, a first metering and pumping zone $M_1$ metering the extrusion of the plastics material through the gap G at the gas dam zone D, a gas well zone W where foaming agent is introduced to the plastics material extruded through the gap G, a second compression zone $C_2$ where the foaming agent and plastics material are compressed, and a second metering and pumping zone $M_2$ where the gas and plastics material are intimately intermixed and advanced to the port 23.

Figure 2:
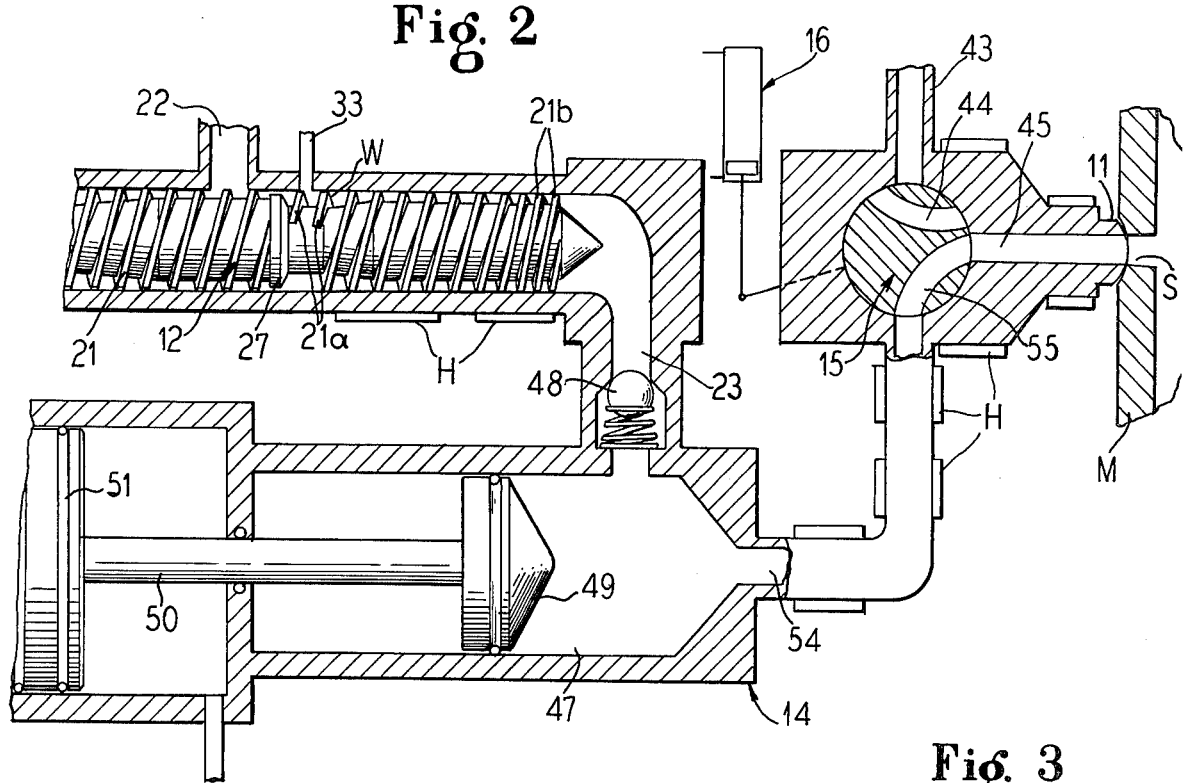
FIG. 2 is a partial view similar to FIG. 1 but showing the valve in position for injection of foamed melt material.

The metering zones $M_1$ and $M_2$ act as pumps to extrude the plastics material first over the dam D and then into the flights A. The turns of the vanes 21 up to the dam section D will thoroughly plasticize the plastics melt to extrude it to the port 22 and over the dam D into the well W where, as shown in FIGS. 1, 2 and 5, gas, such as nitrogen, is introduced through a port 33 and, if desired, additional foaming agents are introduced through a port 34. The gas dam section D and the pressure of the melt at the discharge end of the metering or first pump zone $M_1$ will prevent gas from the port 33 escaping back to the feed zone F. The section of the screw 12 upstream from the gas well W serves to completely homogenize the plastics melt and mix it with the gas to form a foam.

By way of an example only, it is pointed out that the feed zone F may be about five inches long and about one half inch deep, i.e., gap between the bore 17 and the root diameter 24, the compression zone $C_1$ may be about four inches long diverging to a depth of about 0.13 inches along a four-inch first metering or first pumping zone $M_1$. The gas dam length D may be about one inch and the gap G between the collar 27 and the bore 17 may be about 0.03 inches. The gas well W can be about one or two inches in length with a depth of about 0.2 inches or greater. The second compression zone $C_2$ may be about 2 inches in length diverging to the second metering zone or pump $M_2$ having a depth of about 0.18 inches and a length of about five inches. The flights 21b in zone A can be about 2 inches long. The dimensions can vary greatly from these illustrations under different operating conditions and with different types of injection molding machines.

The port 22, as shown in FIG. 1, feeds the plasticized melt from the first metering zone or pump $M_1$ through a passageway 35 discharging into the cylinder 36 of the first extruder 13. A check valve 37 in this passageway 35 prevents back flow from the cylinder 36 to the port 22. An injection head 38 slides in the bore 36 and is driven through a piston rod 39 from a piston 40 operating in a cylinder 41 and receiving and exhausting operating fluid through ports 42.

A passageway 43 connects the interior of the cylinder 36 with the control valve 15 and this valve has a passageway 44 connecting the passage 43 to the nozzle 11 when in the position of FIG. 1. Thus, plasticized melt material in advance of the gas dam D will be extruded through the port 22 and passageway 35 into the cylinder 36 where the injector head 38 will force the material through the passageway 43 and valve passageway 44 through the nozzle 11 into the mold M. This injection will continue only so long as the actuator 16 for the valve 15 holds the valve passageway 44 in registration with the passage 43 of the first injector 13 and the passage 45 of the nozzle 11, as shown in FIG. 1.

As also shown in FIG. 1, the port 23 is connected by a passage 46 with the cylindrical chamber 47 of the second injector 14 to receive foamed plastics material from the port. A check valve 48 prevents back flow of the melt from the cylinder 47 to the port 23.

The second injector 14, like the first injector 13, has an injector head 49 connected by a piston rod 50 with a driving piston 51 in a cylinder 52 receiving and exiting driving fluid through ports 53. The injector head 49 forces the foamed melt in the cylinder 47 through a passage 54 to the valve 15 which in the FIG. 1 position closes the passage 54.

As shown in FIG. 2, the actuator 16 has shifted the valve 15 from the FIG. 1 position to register a second passage 55 in the valve with the passages 54 and 45 thereby permitting the injector head 49 to force the foamed plastics material from the chamber 47 through the nozzle 11 into the mold M.

Figure 3:
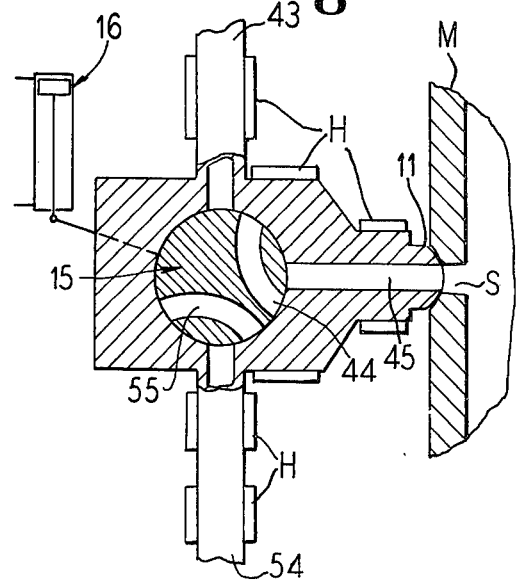
FIG. 3 is a partial view similar to FIG. 1 but showing the valve in closed position for the solidification of the injected material in the mold.

As shown in FIG. 3, the actuator 16 has rotated the valve 15 so that both of its passages 44 and 55 are out of registration with flow passages from both injectors and the nozzle. Thus, the actuator, when in its middle position of FIG. 1 positions the valve 15 to join the first injector 13 with the nozzle 11, when advanced to its end position of FIG. 2 positions the valve 15 to join the injector 14 with the nozzle 11 and when retracted to its position of FIG. 3 rotates the valve to close the nozzle and the feed passages from both injectors 13 and 14. In the position of FIG. 3, the plastics material injected into the mold will be sealed and can solidify.

Heaters H are provided around the screw housing 18, the injector, the passages from the injector, the valve, the nozzle, and wherever else desired to keep the plastics melts in a flowing condition.

While the drawings show tubular passages between the ports of the screw housing and the injectors and between the injectors and the valve, it will, of course, be understood that a single block or housing could be provided with the bores for the screw, the injector heads, and the valve to avoid the use of connecting tubes.

From the above descriptions, it will be understood that this invention provide a simplified injection unit for solid and foamed plastics melts and having only a single screw extruder, a single nozzle, and a valve, with the screw also capable of forming the foamed melt. The screw can operate continuously feeding piston and cylinder injectors in succession.

I claim as my invention:

1. A single screw, single nozzle injection unit for sequential injection of unfoamed and foamed plastics melts to a mold for forming skin covered foamed plastics articles which comprises a housing having a cylindrical bore, an elongated screw rotatably mounted in said bore, a means feeding plastics material to said bore at one end of said screw, a gas inlet feeding foaming agent to said bore intermediate the ends of said screw, a seal radiating from said screw intermediate the ends thereof defining an extrusion gap communicating with said gas inlet, said screw having helical vanes mating with said bore and varying root diameters along the length thereof, said root diameters cooperating with said vanes to provide a feed zone advancing plastics material from the one end of the screw, a compression zone for compressing and plasticizing the material, a first pumping zone for extruding the material through said gap, a gas well zone for mixing the plastics material extruded from the gap with gas from said gas inlet, a second pumping zone advancing the gas and plastics material, and a mixing zone forming a gas foamed plastics material, a first port communicating with said first pumping zone, a second port communicating with said mixing zone, a first injector communicating with said first port, a second injector communicating with said second port, a nozzle, a valve selectively joining said injectors with said nozzle, injector heads for forcing the plastics material from the injectors to the valve, and an actuator for the valve to first join the first injector with the nozzle for feed of skin melt material to the mold, for next joining the second injector with the nozzle for feed or foamed melt material to the mold and for next sealing the nozzle from both injectors to allow solidification of the melt material in the mold.

2. The injection unit of claim 1, wherein the elongated screw has a vane with a free end in the gas well zone to receive the gas and plastics material to form the foamed melt.

3. The unit of claim 1, wherein the injectors have cylinders communicating with said ports and injection heads slidable in said cylinders to force the unfoamed and foamed plastics melts to said valve.

4. The unit of claim 1 wherein said injection heads are driven by fluid actuated pistons.

* * * * *